United States Patent
Glucksman

[15] 3,694,881
[45] Oct. 3, 1972

[54] METHOD FOR MANUFACTURING SQUIRREL-CAGE ROTORS FOR FLUID MOVING DEVICES

[72] Inventor: Dov Z. Glucksman, 26 Chase Ave., West Newton, Mass. 02165

[22] Filed: June 10, 1970

[21] Appl. No.: 44,990

Related U.S. Application Data

[62] Division of Ser. No. 729,031, May 14, 1968, Pat. No. 3,536,416.

[52] U.S. Cl. ........29/156.8 R, 29/156.8 CF, 416/178
[51] Int. Cl. ......B21k 3/04, B23p 15/02, B23p 15/04
[58] Field of Search..29/156.8 CF, 156.8 R; 416/178

[56] References Cited

UNITED STATES PATENTS 2,310,841   2/1943   Curtis................29/156.8 CF
3,536,416   10/1970   Glucksman................416/178

FOREIGN PATENTS OR APPLICATIONS 1,281,041   11/1961   France................29/156.8 CF Primary Examiner—John F. Campbell
Assistant Examiner—Donald P. Rooney
Attorney—Erwin Salzer

[57] ABSTRACT

A method for manufacturing squirrel-cage rotors for fluid moving devices by assembling blade-shaped tubular bars of a thermoplastic material to form spatially a cylindrical pattern, and mounting end members of a thermoplastic material on said bars by insertion of pin means integral with said end members into the open ends of said tubular bars, and finally bonding the bars and the end members by ultrasonic welding into a unitary structure.

5 Claims, 9 Drawing Figures

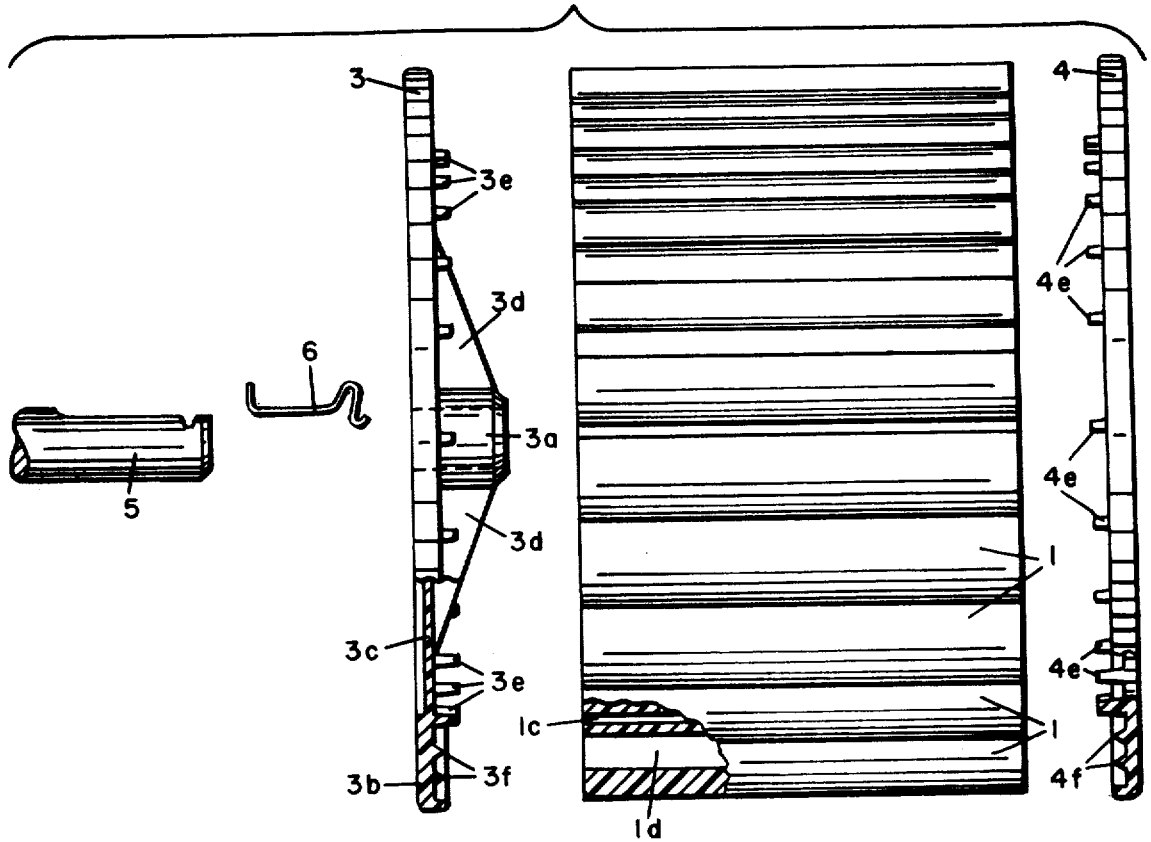
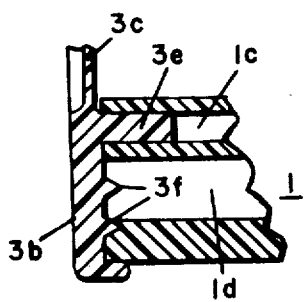
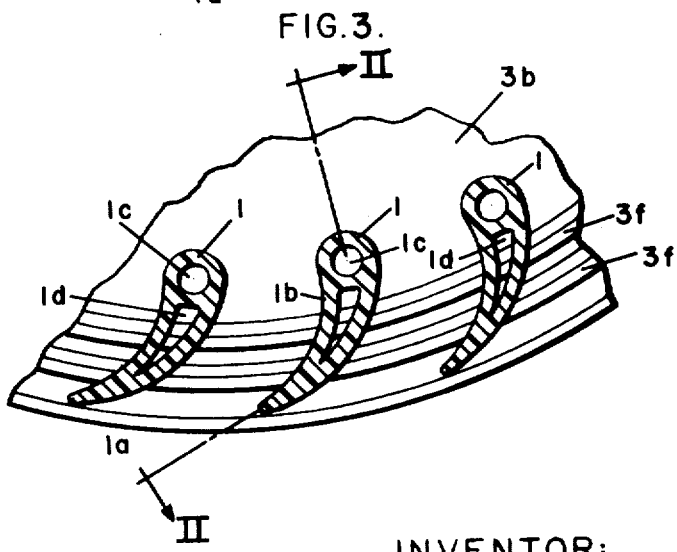

METHOD FOR MANUFACTURING SQUIRREL-CAGE ROTORS FOR FLUID MOVING DEVICES

BACKGROUND OF INVENTION

This is a division of my copending patent application Ser. No. 729,031, filed May 14, 1968 for SQUIRREL-CAGE ROTOR FOR FLUID MOVING DEVICES, now U.S. Pat. No. 3,536,416 issued Oct. 27, 1970.

Squirrel-cage rotors for fluid-moving devices of a plastic material may either be fabricated, or molded as single integral units. Squirrel-cage rotors designed for the latter method are relatively inflexible and, therefore, squirrel-cage rotors designed for production by the former method are preferable wherever flexibility of design is a factor of prime importance. This invention is concerned with fabricating squirrel-cage rotors from plastic extrusions. The geometry of the extrusions may be such as to result in a relatively small exit velocity which, in turn, is conducive to a streamlined flow pattern minimizing the formation of eddies therein. The way in which the extrusions are assembled results in increased dimensional stability and reduced cost of fabrication.

Squirrel-cage rotors are used in connection with two types of fluid moving devices, namely centrifugal blowers and transverse flow blowers. In the former air, or another gaseous medium, is drawn into the cavity of the rotor, or impeller, in an axial direction, and then passes through the rotating cascade of blades into a scroll-shaped housing having an opening from which the air or other gaseous medium is discharged. In the latter air, or another gaseous medium, is drawn by the rotor, or impeller, into a special housing from where it flows transversely through the rotor, or impeller, and is discharged from the housing of the blower in a substantially radial direction. The flow pattern in transverse flow blowers is substantially two dimensional, and the width of the rotor, or impeller, does not significantly affect the flow pattern. Hence transverse flow blowers call generally for relatively long rotors, or impellers.

Squirrel-cage rotors may be fabricated by assembling blades formed of sheet metal blanks having the required length and width, bent to have the required curvature, and provided on both ends with tabs, or equivalent fastening projections. These tabs, or equivalent fastening projections, are used to secure both ends of the blades to end members designed t receive the tabs, or equivalent fastening projections, which are generally crimped to establish a firm connection between the blades and the end members. The latter are generally disc-shaped, or ring-shaped. The cost of manually assembling such a rotor tend to be excessive. Semi-automatic assembly lines designed to cut production cost are of limited value on account of their complexity, and high prime cost.

Squirrel-cage rotors, or impellers, may also be formed of strips of metal such as steel, for instance, or aluminum, fed into a press or punch which forms consecutive blades out of the center portion of the strip of metal, leaving both lateral portions of the strip of metal unpunched to form lateral supports for the blades. Such blade-forming strips are then affixed with the lateral sides thereof to disc-shaped end members. In squirrel-cage rotors fabricated in this fashion there are serious limitations in regard to the width of the blades, and in regard to the curvature, or angles, thereof. Such rotors, or impellers, therefore cannot perform as well as rotors, or impellers, which are assembled of individually formed blades.

The present invention relates to a squirrel-cage rotor manufacturing method not subject to the aforementioned prior art limitations and drawbacks.

SUMMARY OF INVENTION

The method of manufacturing squirrel-cage rotors for fluid moving devices according to this invention includes the steps of supporting a plurality of blade-shaped tubular bars in a pair of temporary supports spaced in a direction longitudinally of said plurality of tubular bars to form spatially a cylindrical pattern, arranging the ends of said bars in a common plane, clamping said plurality of tubular bars in position to preclude relative movement in a direction longitudinally thereof, mounting a first end member having a plurality of pins forming a cylindrical pattern on said plurality of tubular bars by inserting said plurality of pins into the open ends of said plurality of bars at a point situated between said pair of temporary supports, moving said first end member mounted on said plurality of tubular bars a predetermined distance in a direction longitudinally so said plurality of tubular bars, severing said plurality of tubular bars a predetermined distance from said first end member, and mounting a second end member having a plurality of pins forming a cylindrical pattern on said plurality of bars by inserting said plurality of pins into the open ends of said plurality of tubular bars remote from said first end member.

BRIEF DESCRIPTION OF DRAWINGS

FIG. 1 is an exploded view of the constituent parts of a squirrel-cage rotor for fluid moving devices that lends itself particularly well to be manufactured in accordance to this invention;

FIGS. 2 and 3 show details of a squirrel-cage rotor for fluid moving devices formed by assembling the parts of FIG. 1, FIG. 2 being a section along II—II of FIG. 3 and FIG. 3 being a transverse section through a portion of the squirrel-cage rotor fabricated by assembling the parts of FIG. 1.

DESCRIPTION OF PREFERRED MODE OF MANUFACTURE

Figure 4A:
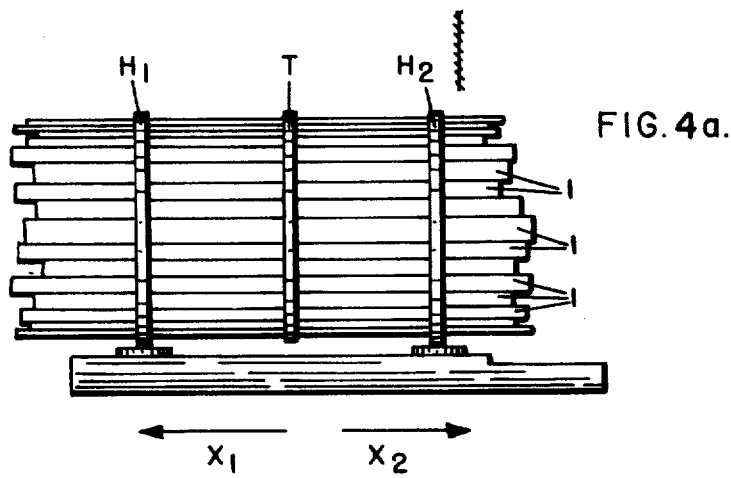
FIGS. 4a–4f, inclusive, illustrate diagrammatically consecutive steps in fabricating according to this invention a squirrel-cage rotor for fluid moving devices.
Figure 4B:
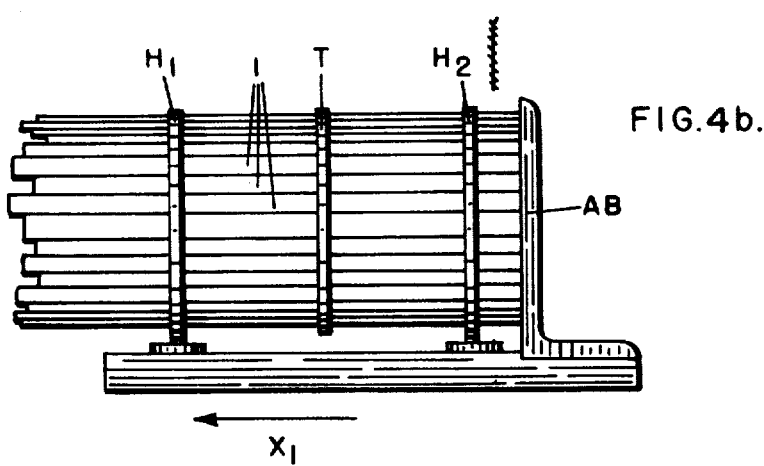
Figure 4C:
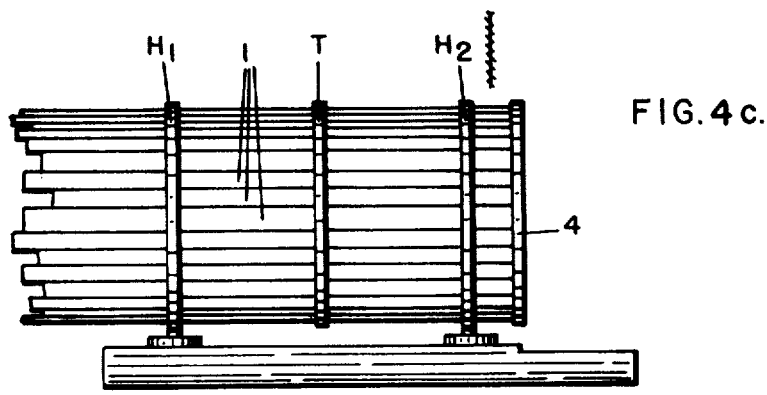
Figure 4D:
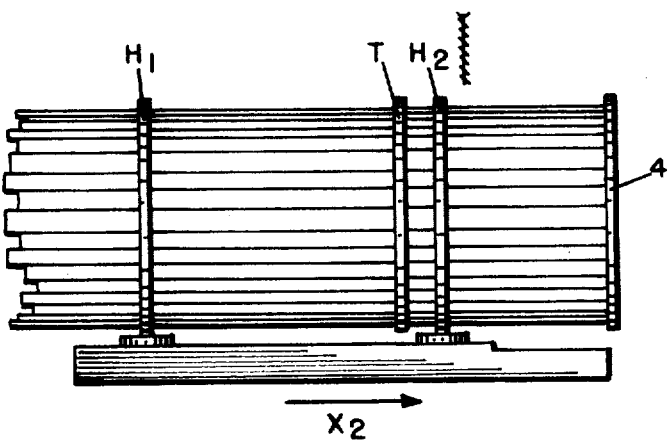
Figure 4E:
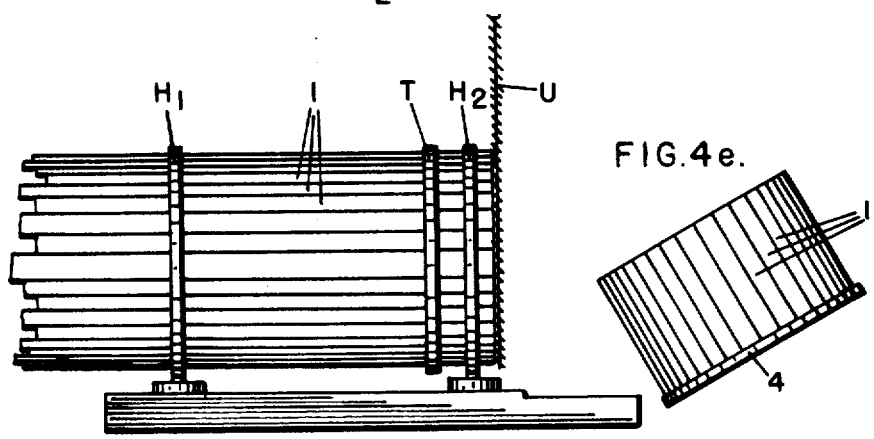

Referring now to FIG. 1, this figure shows a plurality of blades 1 having the same geometrical configuration. FIG. 1 further shows a pair of substantially disc-shaped end member 3 and 4. End member 3 defines a hub 3a for receiving a shaft 5 which may be keyed to hub 3a by means of key clip 6. End member 3 includes an outer rim portion 3b, and an intermediate plate portion 3c arranged between rim portion 3b and hub 3a. A plurality of radially extending reinforcement ribs 3d ties the plate portion 3c to hub 3a. Rim portion 3b is provided with pins 3e intended to engage the passages or cavities 1c, defined inside of tubular blades 1. Both end members 3 and 4 are of a thermoplastic material, and provided with so-called energy directors for ultrasonic welding which are circular and wedge-shaped in crosssection. Reference character 3f has been applied to indicate the energy directors on end member 3 and reference character 4f has been applied to indicate the energy directors on end member 4. End member 4 is further provided with axially inwardly extending pins 4e intended to engage the passages 1c in tubular blades 1. Pins 3e and 4e are tapered in order to allow for simple location in passages 1c. The taper also provides for an interference fit with passages 1c so that these two elements will fuse together when ultrasonic vibrations are applied to members 3 and 4. Pins 3e, 4e may also be cemented by an adhesive to tubular passages 1c. FIG. 3 shows the annular configuration of energy directors 3f on end members 3. The energy directors 4f on end member 4 have the same shape. When fused, energy directors 3f,4f melt due to the heat generated by the friction caused by the ultrasonic vibrations, and thus firmly secure blades 1 to end members 3 and 4. The pins 3e,4e of end members 3,4 engage passages 1c of blades 1 when the parts shown in FIG. 1 are assembled as shown in FIG. 2. When end members 3,4 and blades 1 are assembled to form a squirrel-cage rotor, end members 3,4 support all tubular blades 1 on both ends thereof.

Referring now to FIGS. 4a to 4f, inclusive, reference character 1 has been applied to indicate a system of tubular blade-shaped extrusions arranged in a cylindrical spatial pattern as shown more in detail in FIG. 3. Blade-shaped extrusions 1 are held in position by a pair of annular blade holders $H_1,H_2$ having perforations (not shown) for properly positioning blades 1. A chuck T is arranged between blade holders $H_1,H_2$. Chuck T is adapted to selectively apply clamping pressure to blades 1 to preclude any relative movement of blades 1 in the direction of arrows $X_1$, $X_2$ and to allow joint movement of chuck T and blades 1 in the direction of arrows $X_1$ and $X_2$. When the clamping pressure of chuck T upon tubular blades 1 is released, chuck T may be moved relative to blades 1 in the directions of arrows $X_1$ and $X_2$.

In FIG. 4 reference character AB has been applied to indicate an abutment which may be used for positioning the right ends of blades 1 in a common plane. During this positioning operation chuck T does not apply any clamping pressure upon blades 1 to allow relative movement thereof in the direction of arrow $X_1$.

Thereupon pressure is applied to blades 1 by chuck T to preclude any further movement of blades 1 in a direction longitudinally thereof. Then end member 4 is mounted on, and welded to, the right ends of blades 1, this process step being shown in FIG. 4. Mounting of end member 4 on blades 1 is effected by inserting its pins 4e (see FIG. 1) into the axial passages defined by tubular blades 1 and applying ultrasonic vibration to effect fusion.

The next assembly step consists in moving chuck T and blades 1 jointly in the direction of arrow $X_2$ to the position shown in FIG. 4.

Thereupon all blades are severed along a plane parallel to that of end member 4, e.g., by operation of a saw U which is moved transversely across blades 1 as it severs the right ends from the left portions thereof. Thus a separate sub-assembly including end member 4 and blades 1 is formed, as shown to the right of FIG. 4.

Figure 4F:
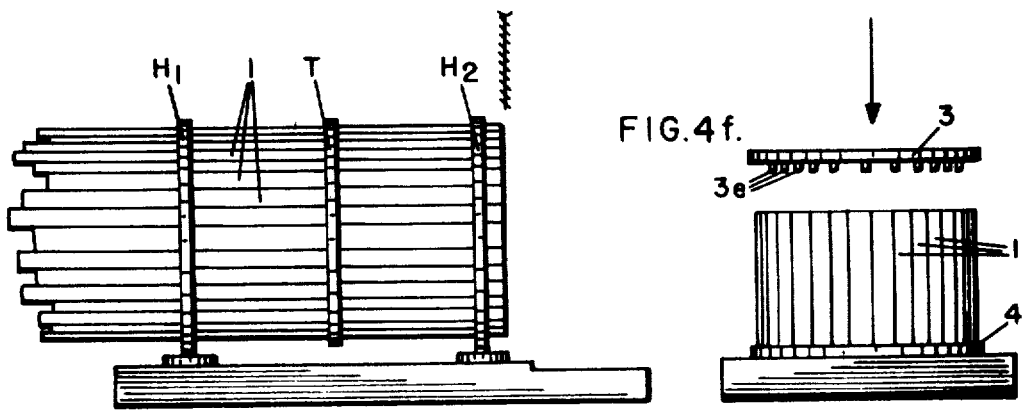

The squirrel-cage rotor is substantially completed by placing end member 3 upon the open ends of tubular blades 1 and pushing pins 3e on end member 3 into the open ends of tubular blades 1. This is indicated in FIG. 4f.

The process of assembly is completed by establishing ultrasonic welds between blades 1 and end members 4,3.

It will be apparent from the above that affixing end members 3,4 to extrusions 1 includes two sequential fastening operations. The first of these fastening operations involves insertion of pins 3e,4e into passages 1c concomittant with positioning of energy directors 3f,4f in juxtaposition to the ends of passages 1d. Now end members 3,4 are temporarily affixed to extrusions 1 by frictional engagement. The second of these fastening operations aims at establishing permanent bonds between parts 1,3 and 4 rather than mere frictional engagement thereof. These permanent bonds are established by ultrasonic welding and are, therefore, fusion bonds.

It will be apparent from FIGS. 4a–4f that supports $H_1,H_2$ slidably supporting extrusions 1 are fixed and that clamping device T precluding relative movement of extrusions 1 is supported by, and jointly movable with, extrusions 1. Clamping device T is arranged at a point between supports $H_1,H_2$ and saw U is positioned to sever extrusions 1 at a point outside supports $H_1,H_2$.

I claim as my invention:

1. A method of manufacturing squirrel-cage rotors for fluid moving devices including the steps of
   a. supporting a plurality of blade-shaped tubular bars in a pair of temporary supports spaced in a direction longitudinally of said plurality of tubular bars to form spatially a cylindrical pattern;
   b. arranging ends of said plurality of tubular bars in a common plane;
   c. clamping said plurality of tubular bars at a point situated between said pair of temporary supports in position to preclude relative movement in a direction longitudinally thereof;
   d. mounting a first end member having a plurality of pins forming a cylindrical pattern on said plurality of tubular bars by inserting said plurality of pins into the open ends of said plurality of tubular bars;
   e. moving said first end member mounted on said plurality of tubular bars jointly with said plurality of tubular bars a predetermined distance in a direction longitudinally of said plurality of tubular bars;
   f. severing said plurality of tubular bars a predetermined distance from said first end member by a saw cut performed with a saw moved in transverse direction relative to said plurality of tubular bars; and
   g. mounting a second end member having a plurality of pins forming a cylindrical pattern on said plurality of tubular bars by inserting said plurality of pins into the open ends of said plurality of tubular bars remote from said first end member.

2. A method as specified in claim 1 wherein said plurality of tubular bars are extrusions of a thermoplastic substance and wherein both said first end member and said second end member are of a thermoplastic substance including the steps of permanently affixing said first end member by ultrasonic welding to said plurality of tubular bars upon insertion of said plurality of pins of said first end member into said open ends of said plurality of tubular bars and permanently affixing said second end member by ultrasonic welding to said plurality of tubular bars upon insertion of said plurality of pins of said second end member into said open ends of said plurality of tubular bars.

3. A method of manufacturing squirrel-cage rotors for fluid moving devices including the steps of
   a. supporting a plurality of blade shaped extrusions of a thermoplastic substance each having a pair of passages in a temporary support to form spatially a cylindrical pattern with one of each of said pair of passages on the radially inner side of said cylindrical pattern and the other of each of said pair of passages on the radially outer side of said cylindrical pattern;
   b. clamping said plurality of extrusions in position with the ends thereof arranged in a common plane so as to preclude movement of said ends thereof out of said common plane;
   c. mounting a first end member of a thermoplastic substance having a plurality of radially inner pins arranged in a circular pattern and having radially outer energy directors on said plurality of extrusions by inserting each of said plurality of pins of said first end member into said one of said pair of passages of said plurality of extrusions;
   d. severing said plurality of extrusions a predetermined distance away from said first end member;
   e. mounting a second end member of a thermoplastic substance having a plurality of radially inner pins arranged in a circular pattern and having radially outer energy directors on said plurality of extrusions by inserting each of said plurality of pins of said second end member into one of said pair of passages of said plurality of extrusions; and
   f. permanently affixing said first end member to said plurality of extrusions by ultrasonic welding upon insertion of each of said plurality of radially inner pins of said first end member into said one of said pair of passages of said plurality of extrusions and permanently affixing said second end member to said plurality of extrusions by ultrasonic welding upon insertion of each of said plurality of radially inner pins of said second end member into said one of said pair of passages of said plurality of extrusions.

4. A method as specified in claim 3 including the steps of
   a. supporting said plurality of extrusions at two points spaced in a direction longitudinally of said plurality of extrusions;
   b. precluding movement of said ends of said plurality of extrusions out of said common plane by applying clamping pressure to said plurality of extrusions at points thereof situated between said two spaced points of support;
   c. mounting said first end member on said plurality of extrusions at a point thereof situated outside said two spaced points of support; and
   d. severing said plurality of extrusions along a plane parallel to said common plane at a point situated outside said two spaced points of support.

5. A method as specified in claim 3 including the steps of
   a. slidably supporting said plurality of extrusions in a direction longitudinally thereof at two fixed points having a predetermined spacing;
   b. sliding said plurality of extrusions relative to said two fixed points and thereby moving said ends of said plurality of extrusions into engagement with a planar abutment surface;
   c. mounting a clamping device on said plurality of extrusions jointly movable with said plurality of extrusions in a direction longitudinally thereof and precluding relative movements of said plurality of extrusions in a direction longitudinally thereof;
   d. jointly moving said plurality of extrusions and said clamping device relative to said two fixed points; and
   e. severing said plurality of extrusions along a plane parallel to said ends thereof.

* * * * *